Patented Aug. 10, 1943

2,326,297

UNITED STATES PATENT OFFICE 2,326,297

COMPOSITION OF MATTER AND METHOD AND STEPS OF MAKING AND USING THE SAME

Mortimer T. Harvey, East Orange, N. J., assignor to The Harvel Corporation, a corporation of New Jersey No Drawing. Application May 17, 1941, Serial No. 393,942

11 Claims. (Cl. 167—24)

The present invention relates generally to insecticidal rotenone products in solution in resins of the phenol-aldehyde type and more particularly the present invention relates to sprayable insecticidal powders containing insecticidal rotenone products. And the present invention also relates to methods and steps for making and using the products of the present invention.

The present application is a continuation in part of my copending application Serial No. 271,515, filed May 3, 1939.

Rotenone and rotenone bearing resinates when exposed to the air, as in thin film or small particles, tend to oxidize or otherwise to deteriorate with the result that their insecticidal strength is depleted.

I have discovered that resins of the phenol-aldehyde type can be used to protect insecticidal rotenone products against deterioration by the air by dissolving the latter in said resins and that the solutions formed can be used in various ways for presenting the rotenone for insecticidal purposes. When initially presented in this form the rotenone product has as much effective insecticidal strength as the rotenone product when used alone and later, after elapse of time sufficient for the unprotected rotenone to have become deteriorated, the rotenone product which is protected by solution in a phenol-aldehyde resin shows little or no depletion in effective insecticidal strength.

One way of using solutions of insecticidal rotenone products in phenol-aldehyde resins is to dissolve them in volatile extenders which are solubly compatible with the rotenone-phenol-aldehyde resin solutions and to apply the extended solution to plant foliage from which the volatile extender evaporates, leaving the rotenone-phenol resin solution in a thin film or in small particles for protection of the plant against insects and other plant pests. Examples of this method are described in my said copending application Serial No. 271,515.

Another way of using solutions of insecticidal rotenone products in resins of the phenol-aldehyde type is to prepare them in a powder which can be dusted or blown onto the surfaces of plants. Following are given illustrative examples of such powders and of methods of preparing them.

*Example 1.*—About ten parts by weight of a tertiary amyl phenol-formaldehyde resin (described below) and one part of derris resinate are melted together at about 95° C. to form a solution and then cooled and ground into a fine powder or dust. This powder or dust is suitable for spraying or dusting onto plants for insecticidal purposes.

About eighty parts by weight of para tertiary amyl phenol and seventy parts of a commercial formalin solution (about 37½% $CH_2O$) are mixed together and to this mixture is added a solution of about ten parts by weight of sodium hydroxide in fifteen parts of water, the caustic soda solution being added slowly to the p-tertiary amyl phenol-formaldehyde mixture and the temperature kept below about 50° C. After all of the caustic soda solution has been added the reaction mixture is allowed to stand for about sixty hours after which it is neutralized with hydrochloric acid and brought up to a state of slight acidity after which it is left to stand for about ten hours. Two layers are formed, the upper layer being an emulsion of water in the p-tertiary amyl phenol-formaldehyde condensation product and the lower layer being a solution of sodium chloride in water. These two layers are separated and the condensation product is washed several times with water to remove acid and sodium chloride and then dehydrated by heating at reduced pressure. The dry condensation product is a solid which can be pulverized and can be melted below 100° C.

*Example 2.*—About ten parts by weight of the p-tertiary amyl phenol-formaldehyde condensation product, (described in Example 1, above), one part of derris resinate and one hundred parts of an inert filler such as silicon dioxide are mixed by heating to melt and dissolve together the condensation product and the derris resinate and stirring to uniformly distribute the silicon dioxide through the mixture after which the mixture is allowed to cool and then is ground and pulverized to a dust. A suitable form of silicon dioxide for this purpose is a product sold under the trade name of "Cellite." This dust can be applied by spraying in the dry state as by blowing or can be made into an emulsion with water which can be sprayed and from which emulsion, after the application, the water evaporates leaving the powder dry on the parts to which the spray was applied. When desired a wetting agent can be used to aid emulsification.

*Example 3.*—About one hundred parts by weight of cardanol-formaldehyde resin, twenty parts of derris resinate, one thousand parts of an inert filler which can be "Cellite" and one part of a wetting agent which can be a commercial sulphonated alcohol or sulphonated phenol (obtainable on the open market) are heated to melt them together and about nine hundred parts of water added to form an emulsion. This emulsion can be sprayed as in the use of the emulsion of Example 2, above.

Other wetting agents can be used in place of the sulphonated alcohol or phenol, above, for example, rosin soap can be used in which case ten parts are used instead of the one part of sulphonated product.

A suitable cardanol-formaldehyde resin can be that of Example II of the Patent 2,157,126 after it has been reacted to a state in which it is a fusible, pulverizable, solid and any of the cardanol resins of the Examples I to VI and the general examples of said Patent 2,157,126, in the fusible, solid state, can be used for this purpose.

*Example 4.*—Another phenol-aldehyde resin which can be used in the practice of the present invention as for example by any of the methods of the numbered examples or general examples of the present disclosure can be made as follows: About six parts of phenol (carbolic acid), six parts of cashew nut shell liquid, eight parts of furfuraldehyde and one part of anhydrous potassium carbonate are heated together at about 120° C. under a reflux condenser for about one and one-half hours after which the reaction mass is boiled at about 120° C. in an open kettle to a brittle button.

*Example 5.*—Still another phenol-aldehyde resin which can be used in the practice of the present invention as for example by any of the methods of the numbered examples or general examples hereof can be made by the methods of Patent 1,921,292 of cashew nut shell liquid and hexamethylene tetramine, to which said patent reference is hereby made. The various condensation products disclosed in that patent can be brought to a fusible, pulverizable solid state.

*Example 6.*—According to one method of practicing the present invention a quantity of an insecticidal rotenone bearing product, such as derris root, is ground to a powder after which the major portion of the insecticidal rotenone is extracted from the powder by impregnation with a solvent phenol-aldehyde condensation product to produce a solution of the insecticidal rotenone product in the phenol-aldehyde condensation product which solution is then pressed out of the said powder. A small quantity of said solution will remain as a coating adhering to the surface of said powder, and, according to the present invention, the combination of said powder with said coating of said solution can serve as an insecticide in the powdered form, said coating being sufficiently dried for the particles of said powder to be separated or loosened from each other by breaking up the coating where it may be holding particles together. Even with very thin coatings of the said solution on said powder, the combination is effective and efficient as an insecticide because rotenone is an effective insecticide in very small amounts. An illustrative example of the present invention according to the method generally described in this paragraph is as follows: About one hundred parts by weight of a cardanol-formaldehyde condensation product is intermixed with an equal weight of powdered or ground derris root, which latter can contain about 5% of derris resinate. The mixture can be heated to a point at which any rapid polymerization or further condensation of the cardanol-formaldehyde condensation product does not take place, for example, at between 50° C. and 100° C., depending on the state of said resin. This heating will facilitate the solution of the derris resinate and other rotenone products carried by the ground derris root. And the cardonal-aldehyde condensation product can be one which is reactive and which is a liquid at normal temperatures or which can be liquefied by heating. Examples of methods of making cardanol-aldehyde condensation products suitable for the practice of the present invention generally and of the present method are described in my Patent Number 2,157,126 and the uncompletely reacted cardanol-aldehyde condensation products generally described therein are suitable for the practice of the present invention as are also the products of Examples I to V of that patent. The syrupy resin described in Example I of that patent is given as a still more particular example because it can be used without any or with only a low heating. Also the other phenol-aldehyde resins described or referred to elsewhere herein can be used for the practice of the present invention by the method of this example.

Reference is hereby made to said copending application Ser. No. 271,515, filed May 3, 1939, patented May 20, 1941, Number 2,242,911, for a further disclosure of phenol-aldehyde condensation products and solution of insecticidal rotenone products in phenol-aldehyde condensation products suitable for the practice of the present invention.

Other examples of inert filler suitable for uses similar to that of the silicon dioxide named above are wood flour, cork dust, slate dust, marble dust and any other inert filler for extending the solution of rotenone in the phenol-aldehyde condensation product.

Having thus described my invention, what I claim and desire to protect by Letters Patent is:

1. A solution of an insecticidal rotenone product in a solid, pulverizable and fusible phenol-aldehyde condensation product.

2. An insecticidal spray comprising a solid solution of an insecticidal rotenone product in a phenol-aldehyde condensation product.

3. An insecticidal dust comprising particles of a solid solution of an insecticidal rotenone product in a phenol-aldehyde condensation product.

4. A solid solution of an insecticidal rotenone product in a phenol-aldehyde condensation product said condensation product in its initial stage of condensation being a liquid capable of further condensation to a solid, pulverizable state.

5. The method comprising dissolving an insecticidal rotenone product in a phenol-aldehyde condensation product which is in a liquid state and is capable of being solidified to a pulverizable state and subsequently bringing said condensation product to a solid state.

6. The method which comprises dissolving an insecticidal rotenone product in a liquid, heat reactable phenol-aldehyde condensation product and heating to bring said condensation product to a pulverizable state.

7. The method which comprises dissolving an insecticidal rotenone product in a liquid, heat reactable phenol-aldehyde condensation product, heating to bring said condensation product to a pulverizable state, and pulverizing.

8. The method which comprises heating a phenol-aldehyde resin to bring it to a liquid state, dissolving therein an insecticidal rotenone product, and subsequently bringing the solution to a solid state.

9. A sprayable emulsion comprising an insecticidal dust comprising particles of a solid solution of an insecticidal rotenone product in a phenol-aldehyde resin.

10. An insecticidal dust comprising particles of an inert filler having on the surfaces thereof a solution of an insecticidal rotenone product in a phenol-aldehyde condensation product.

11. An insecticidal solid solution comprising a solution of an insecticidal rotenone product in a phenol-aldehyde condensation product.

MORTIMER T. HARVEY.